No. 893,803. PATENTED JULY 21, 1908.
A. A. JONES.
MILKING STOOL.
APPLICATION FILED APR. 13, 1908.
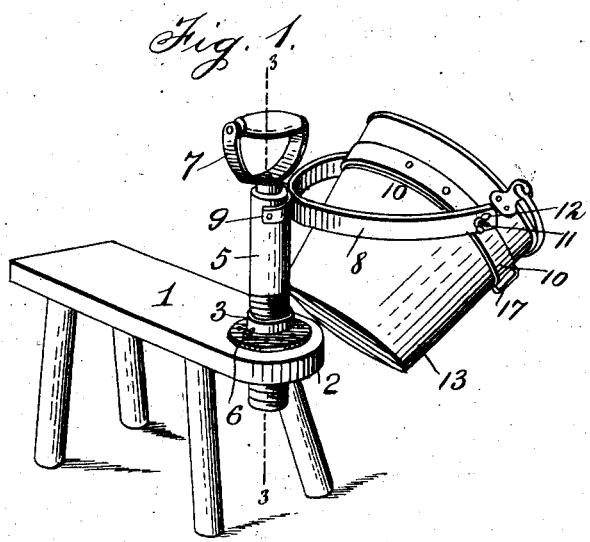
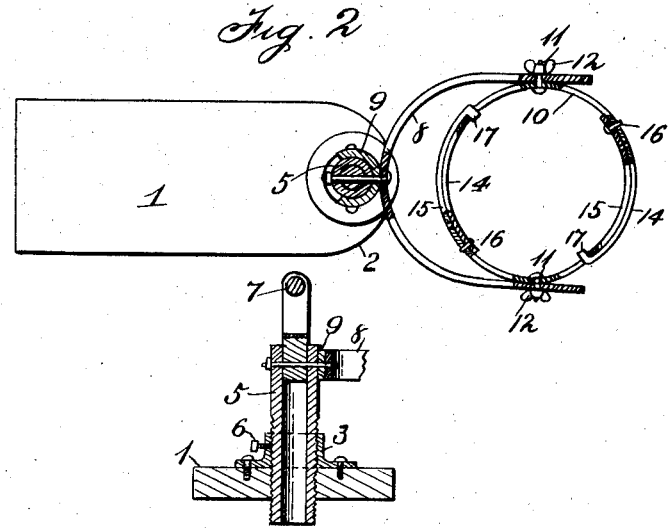
Witnesses
F. L. Ourand
C. H. Griesbauer
Inventor
A. A. Jones
by H. B. Willson & Co
Attorneys

UNITED STATES PATENT OFFICE.

ARTHUR A. JONES, OF CASS CITY, MICHIGAN.

MILKING-STOOL.

No. 893,803.  Specification of Letters Patent.  Patented July 21, 1908.

Application filed April 13, 1908. Serial No. 426,830.

*To all whom it may concern:*

Be it known that I, ARTHUR A. JONES, a citizen of the United States, residing at Cass City, in the county of Tuscola and State of Michigan, have invented certain new and useful Improvements in Milking-Stools; and I do declare the following to be a full, clear, and exact description of the invention, such as will enable others skilled in the art to which it appertains to make and use the same.

This invention relates to an improved milking stool and the object thereof is to provide a stool with an attachment for holding a bucket in any desired position to permit the use of both hands when milking.

With this and other objects in view, the invention consists of certain novel features of construction, combination and arrangement of parts, as will be more fully described and particularly pointed out in the appended claims.

In the accompanying drawings, Figure 1 is a perspective view of the stool equipped with this improved bucket holding device showing a bucket held in tilted position thereby; Fig. 2 is a horizontal section through the bucket encircling band; and Fig. 3 is a detailed sectional view taken on the line 3—3 of Fig. 1.

In the embodiment illustrated, a stool 1 of ordinary construction is shown, preferably provided at one end with a rounded portion 2 having an aperture extending transversely therethrough. An internally screw threaded metallic collar 3 encircles this aperture and is secured to the stool in any desired manner preferably by means of an apertured flange 4. A screw threaded post 5 passes through said collar and aperture and the threads thereof are engaged with the threads of the collar to provide for its vertical adjustment. A set screw 6 extends through the collar and is adapted to engage the post to lock it in any desired position. A handle member 7 is preferably attached to the upper end of the post 5 for lifting and moving the stool from place to place.

An approximately U-shaped member 8 is pivotally connected at its curved portion with said post preferably at the upper end thereof by means of a clamp 9 which is fastened to the post by means of a bolt which extends through said clamp 9, the post 1, and the shank of the handle 7.

An adjustable band 10 is pivotally connected at diametrically opposite points to the free ends of the U-shaped member 8 by means of bolts as 11 provided with winged nuts as 12 for clamping said band in adjusted position relative to said arms. This band 10 is adapted to encircle a milk pail 13. This band 10 is preferably composed of two members 14 and 15 arranged in over-lapping position to form a circular member and each is provided at one end respectively with headed studs as 16 which are designed to pass through apertures in the other member. The free ends of these members are preferably passed through keepers as 17 carried by the member which they over-lap.

In the use of this device when the parts are assembled as shown in Fig. 1 the bucket may be tilted in any desired position either in a lateral or in a vertical plane by means of the pivotal connection of the U-shaped member with the post 5 and of the bucket encircling member with the free ends of said U-shaped member.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

I claim as my invention:

1. A milking stool provided with a supporting member having vertically and laterally tilting bucket carrying means mounted thereon.

2. A milking stool provided with a supporting member, a member pivoted to said supporting member, a bucket engaging member pivotally mounted on said last-mentioned member, said pivoted members being arranged to swing in planes at right angles to each other.

3. A milking stool having an aperture extending transversely through one end thereof, an internally screw threaded collar surrounding said aperture and attached to said stool, a threaded post adjustably mounted in said collar, means for locking said post in adjusted position, a vertically and laterally tilting bucket carrying member mounted on said post.

4. A bucket holding attachment for milking stools comprising a supporting member, a bucket engaging member, a member pivotally connected with said support and with said bucket engaging member.

5. A bucket holding attachment for milking stools comprising a supporting member and a bucket engaging member, a member pivotally connected with said support and with said bucket engaging member, and means for locking said last mentioned member to said bucket engaging member.

6. A bucket holding attachment for milk stools comprising an upright support, a U-shaped member pivotally connected therewith, and a bucket encircling member pivotally connected with the free ends of said U-shaped member.

7. A bucket holding attachment for milking stools comprising a vertically adjustable supporting member, and means for carrying a bucket connected with said support and constructed to swing in vertical and lateral planes.

In testimony whereof I have hereunto set my hand in presence of two subscribing witnesses.

ARTHUR A. JONES.

Witnesses:
  E. B. LANDON,
  GEO. E. PERKINS.